Figure 1:
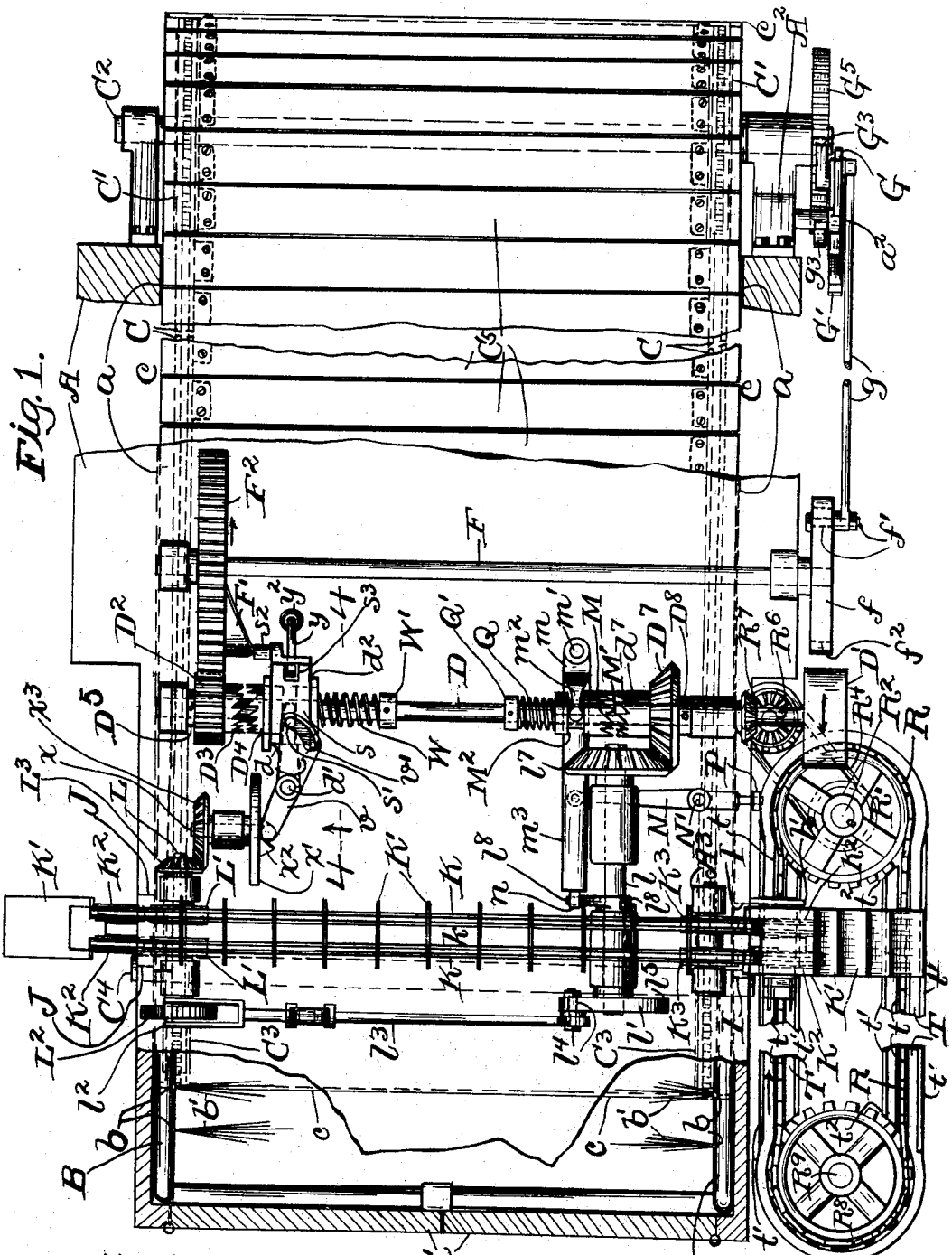

No. 765,306. PATENTED JULY 19, 1904.
H. H. BRIDGWATER & J. HALEY.
WARE FEEDING APPARATUS FOR LEERS OR ANNEALING FURNACES.
APPLICATION FILED NOV. 14, 1903.
NO MODEL. 7 SHEETS—SHEET 1.

WITNESSES:
Daniel E. Daly.
Victor C. Lynch.

INVENTORS
Harry H. Bridgwater
Jonathan Haley
BY
their ATTORNEYS

No. 765,306. PATENTED JULY 19, 1904.
H. H. BRIDGWATER & J. HALEY.
WARE FEEDING APPARATUS FOR LEERS OR ANNEALING FURNACES.
APPLICATION FILED NOV. 14, 1903.
NO MODEL. 7 SHEETS—SHEET 3.

WITNESSES:
Daniel E Daly.
Victor C. Lynch.

INVENTORS
Harry H. Bridgwater
and Jonathan Haley
BY
Lynch & Worer
Their ATTORNEYS

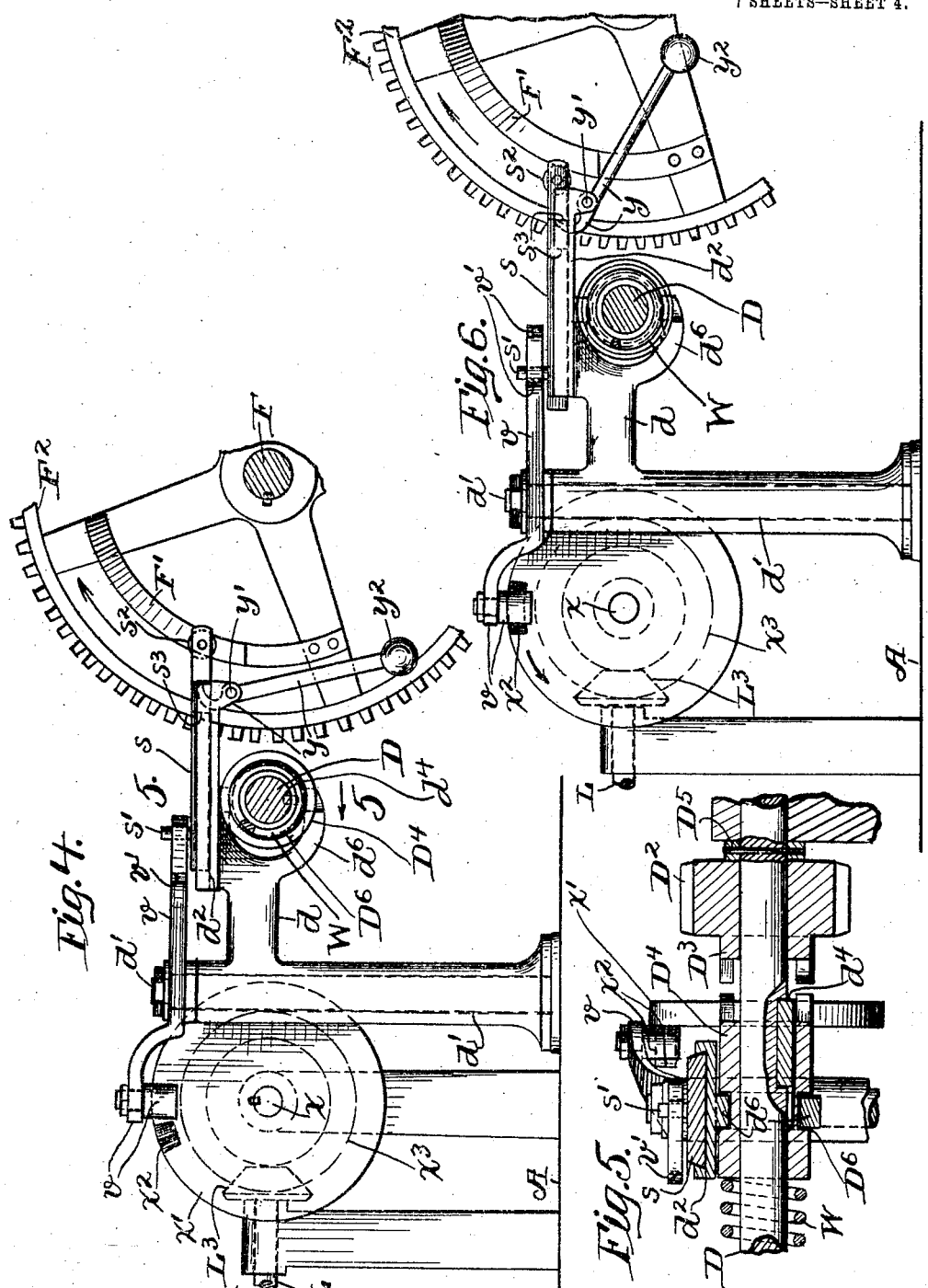

No. 765,306. PATENTED JULY 19, 1904.
H. H. BRIDGWATER & J. HALEY.
WARE FEEDING APPARATUS FOR LEERS OR ANNEALING FURNACES.
APPLICATION FILED NOV. 14, 1903.
NO MODEL. 7 SHEETS—SHEET 5.
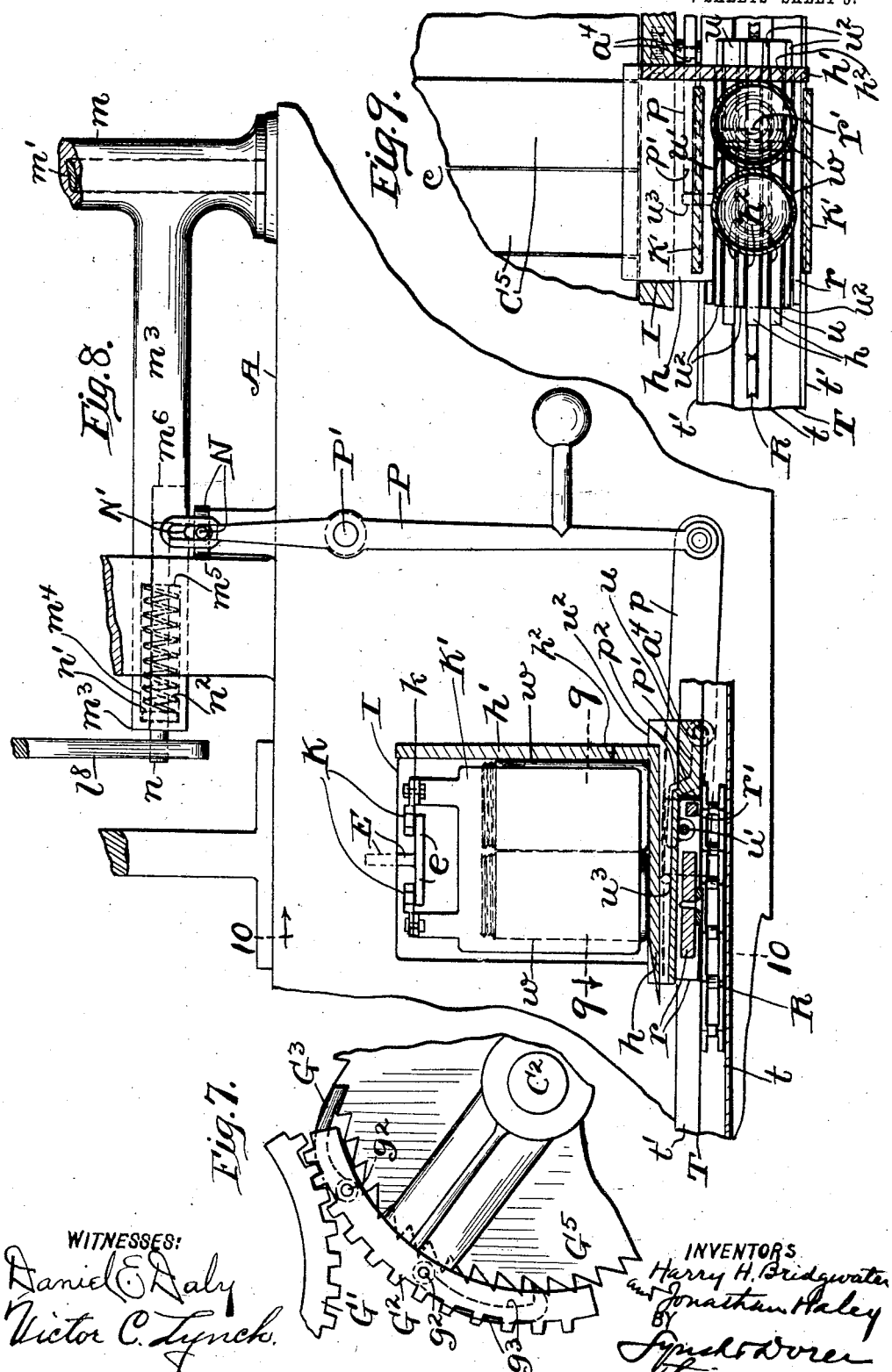
WITNESSES:
Daniel E. Daly
Victor C. Lynch
INVENTORS
Harry H. Bridgwater
and Jonathan Haley
BY
their ATTORNEYS

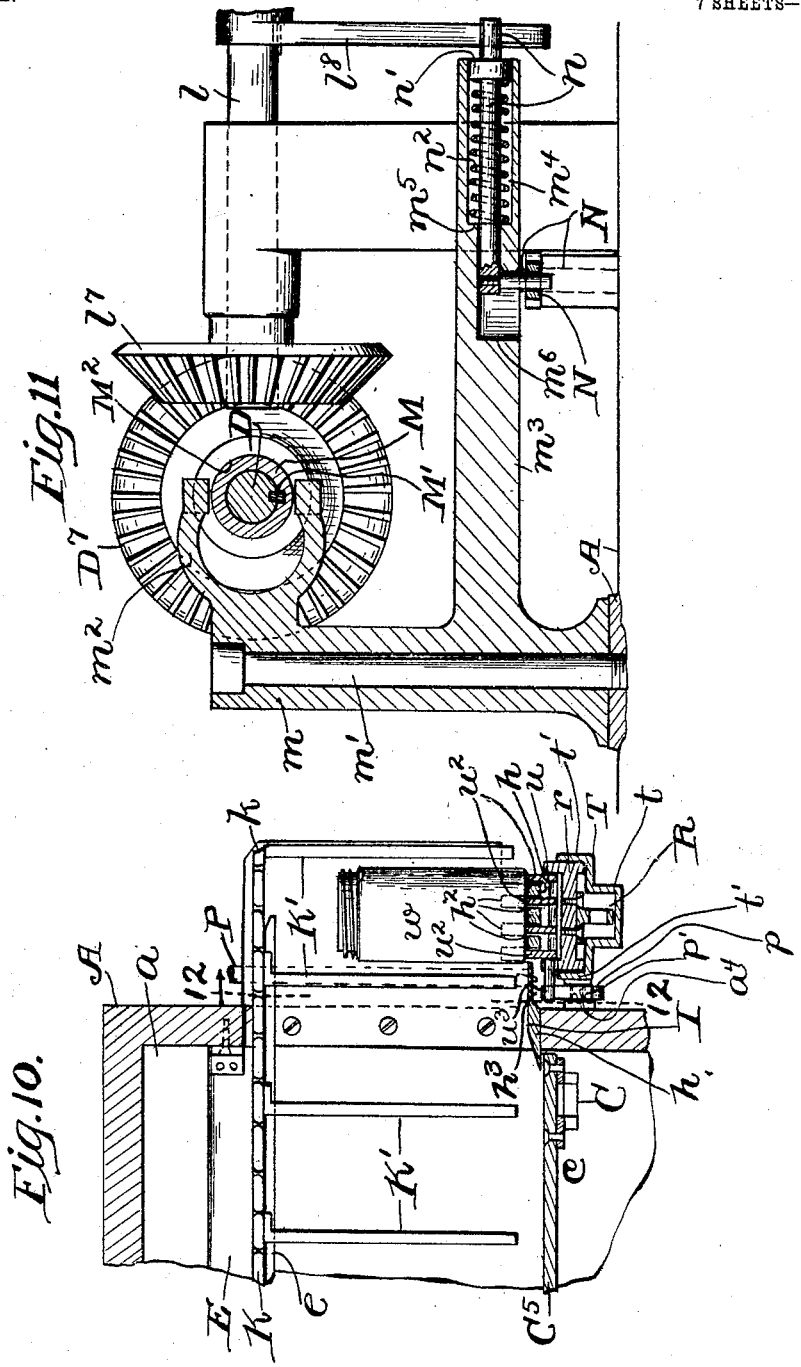

No. 765,306. PATENTED JULY 19, 1904.
H. H. BRIDGWATER & J. HALEY.
WARE FEEDING APPARATUS FOR LEERS OR ANNEALING FURNACES.
APPLICATION FILED NOV. 14, 1903.
NO MODEL. 7 SHEETS—SHEET 7.
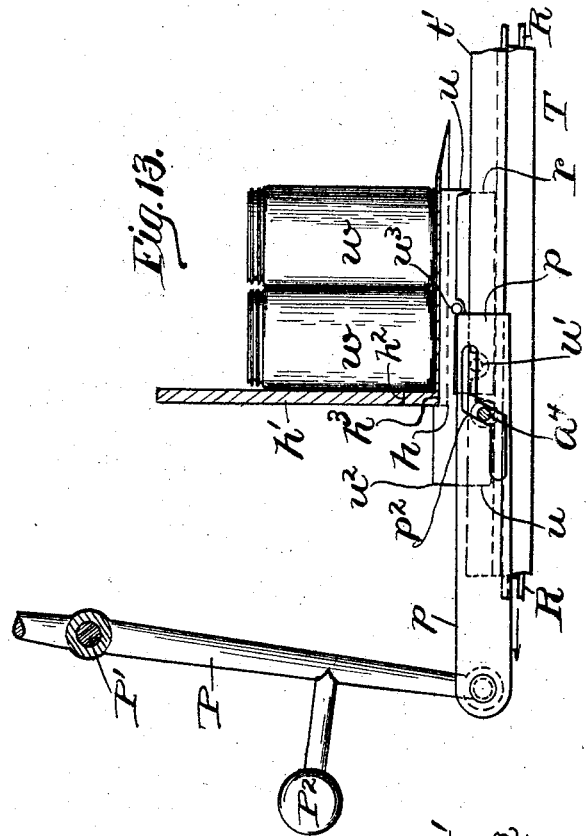
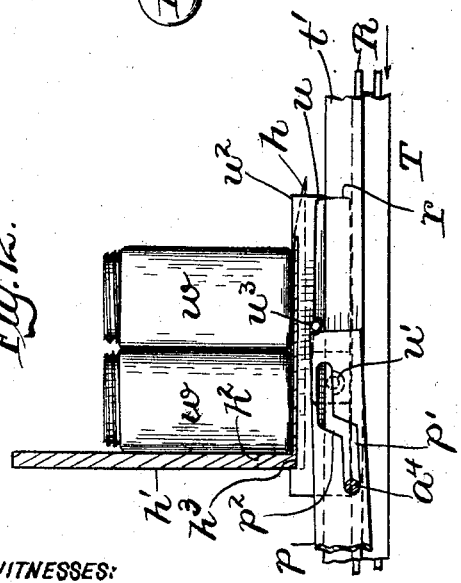
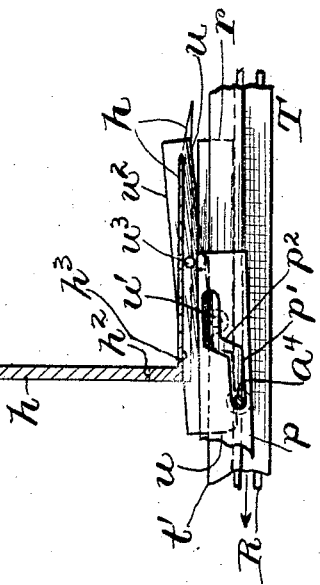
WITNESSES:
Daniel E. Daly
Victor C. Lynch
INVENTORS
Harry H. Bridgwater
and Jonathan Haley
BY
their ATTORNEYS No. 765,306. Patented July 19, 1904.

UNITED STATES PATENT OFFICE.

HARRY H. BRIDGWATER AND JONATHAN HALEY, OF AKRON, OHIO, ASSIGNORS TO THE AKRON GLASS AND MACHINERY COMPANY, OF AKRON, OHIO, A CORPORATION OF OHIO.

WARE-FEEDING APPARATUS FOR LEERS OR ANNEALING-FURNACES.

SPECIFICATION forming part of Letters Patent No. 765,306, dated July 19, 1904.

Application filed November 14, 1903. Serial No. 181,180. (No model.)

*To all whom it may concern:*

Be it known that we, HARRY H. BRIDGWATER and JONATHAN HALEY, both citizens of the United States of America, residing at Akron, in the county of Summit and State of Ohio, have invented certain new and useful Improvements in Ware-Feeding Apparatus for Leers or Annealing-Furnaces; and we do hereby declare the following to be a full, clear, and exact description of the invention, such as will enable others skilled in the art to which it pertains to make and use the same.

This invention relates to improvements in apparatus for conveying glassware and other ware to be annealed to, into, and through the annealing oven or chamber of an annealing-furnace.

This invention pertains more especially to improved apparatus suitable for use in connection with a leer which has an annealing-chamber open at its rear and ware-discharging end and heated by heating-burners or heating appliances at its opposite and forward end and having a lateral doorway or inlet in one side wall thereof and near the said heating means for accommodating the passage of ware to be annealed into the said chamber and onto an endless conveyer arranged and intermittently operated to convey the said ware longitudinally of and through the said chamber in the direction of the rear end of the chamber.

This invention chiefly comprises improved means for conveying the ware to be annealed to the aforesaid inlet, improved means for feeding the ware through the said inlet onto the aforesaid endless conveyer and for arranging the said ware in rows upon and transversely of the said conveyer, improved means for intermittently operating the said conveyer, and such a relative arrangement and operation of the parts of the apparatus that the ware-feeding means shall, upon the arrival of an article which is to be annealed at the outer side of and opposite to the aforesaid inlet, be automatically operated to feed the said article through the said inlet into the annealing-chamber and onto the aforesaid conveyer, and the said conveyer shall, upon the formation of each row of ware fed to the said conveyer, be automatically actuated long enough to carry the said row of ware toward the rear and discharging end of the annealing-chamber and out of the way of the path of ware next fed onto the said conveyer in forming the next succeeding row of ware on the conveyer.

The object of this invention is to provide apparatus whereby the ware which is to be annealed is conveyed from the place at which the ware is formed to the annealing-chamber and into and through the said chamber with facility and without liability of breakage of or injury to the ware in the passage of the latter into and through the said chamber.

Another object is to render the said apparatus simple in construction and convenient and reliable in its operation.

With these objects in view and to the end of realizing other advantages hereinafter appearing this invention consists in certain features of construction and combinations of parts hereinafter described, and pointed out in the claims.

Figure 2:
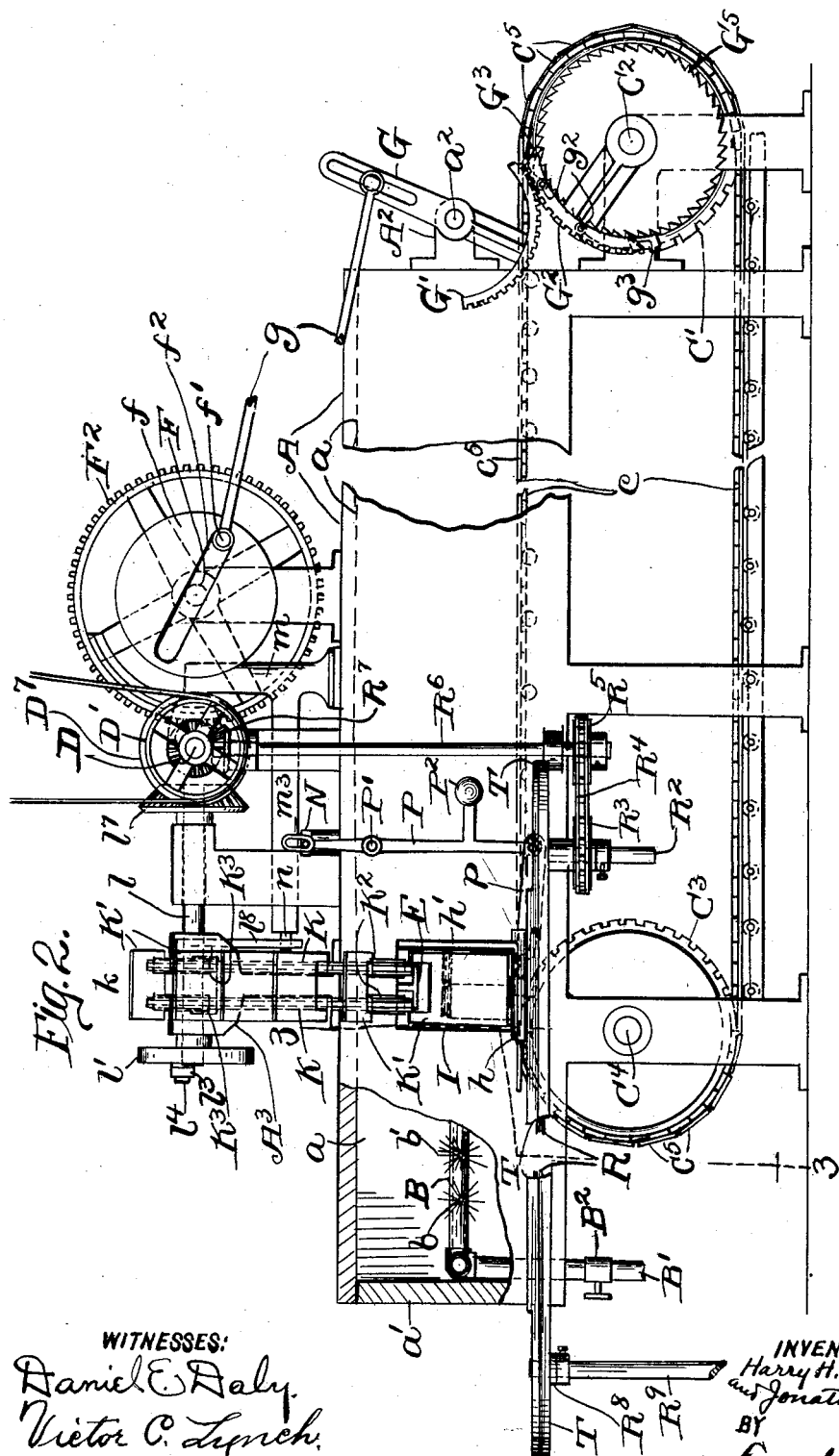
Figure 3:
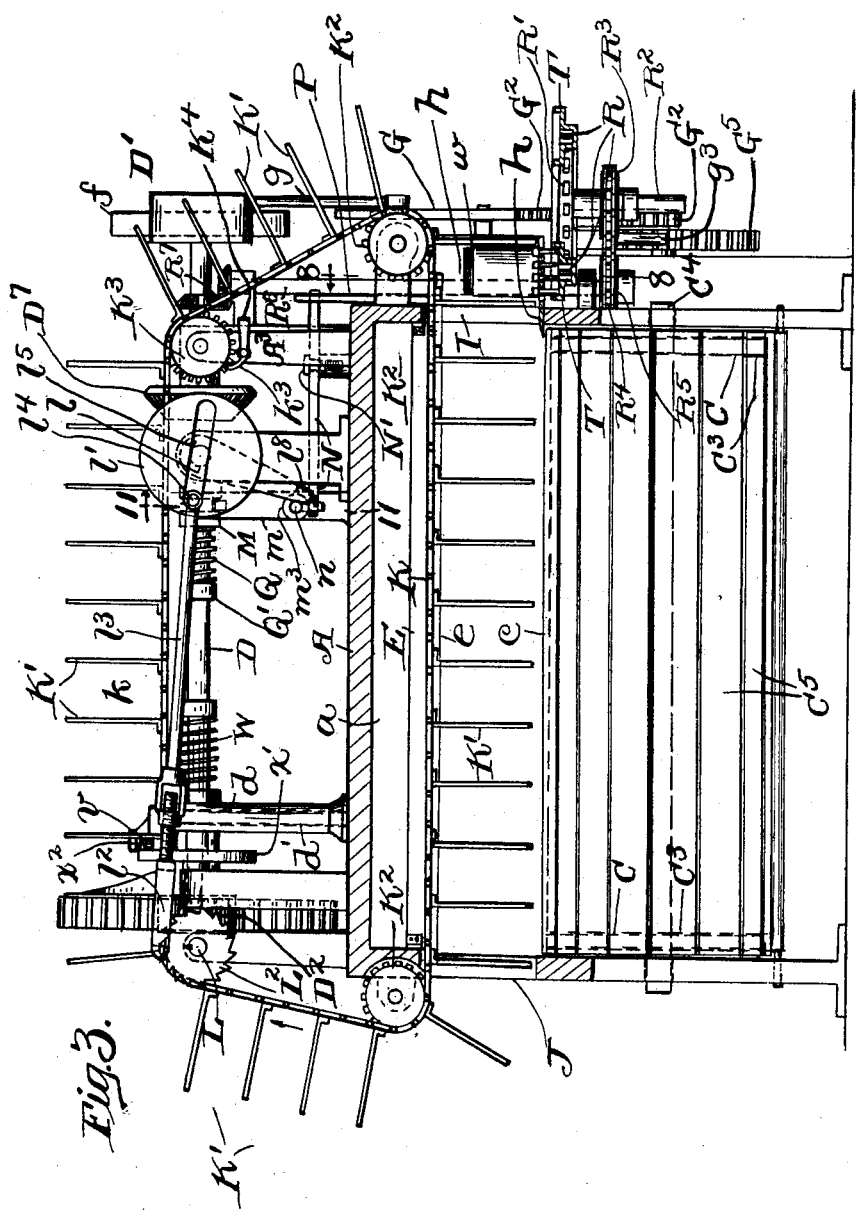

In the accompanying drawings, Figure 1 is a top plan, partly in section, of a portion of an annealing-furnace and the greater portion of the apparatus embodying the said invention, and portions are broken away in this figure to reduce the size of the drawing. Fig. 2 is a side elevation of the same, and portions are broken away and in section in this figure to reduce the size of the drawing and to more clearly show the construction. Fig. 3 is a forward end elevation, partly in section, on line 3 3, Fig. 2. Fig. 4 is an elevation, largely in section, on line 4 4, Fig. 1, looking in the direction indicated by the arrow. Fig. 5 is an elevation, largely in section, on line 5 5, Fig. 4, looking in the direction indicated by the arrow. Fig. 6 is an elevation, largely in section and corresponding with Fig. 4, except that in Fig. 6 members of the mechanism instrumental in controlling the operation of the clutch employed in establishing operative connection between the pinion $D^2$ and the driving-shaft D are shown shifted, as required to permit the establishment of the said operative connection. Fig. 7 is an elevation illustrating a portion of the ratchet-wheel and engaging pawls employed in the intermittent rotation of the shaft $C^2$. Fig. 8 is a side elevation, largely in section, on line 8 8, Fig. 3, looking outwardly. Fig. 8 illustrates a portion of the furnace and accompanying ware-feeding apparatus. Fig. 9 is a top plan, in section, on line 9 9, Fig. 8. Fig. 10 is an elevation, largely in vertical section, on line 10 10, Fig. 8, looking in the direction indicated by the arrow. Fig. 11 is an elevation, largely in vertical section, on line 11 11, Fig. 3, looking in the direction indicated by the arrow. Fig. 12 is an elevation, largely in section, on line 12 12, Fig. 10, looking outwardly. Fig. 13 is an elevation, largely in section and corresponding with Fig. 12, except that in Fig. 13 the bar $p$ is shown being actuated as required to disengage it from the pin or projecting member $u^3$ of the platform $u$ of the ware-conveying car. Fig. 14 is an elevation, largely in section and corresponding with Fig. 12, except that in Fig. 14 the platform $u$ of the ware-conveying car is shown without a load. Figs. 4, 5, 6, 7, 8, 9, 10, 11, 12, 13, and 14 are drawn on the same scale, but on a scale considerably larger than Figs. 1, 2, and 3.

Referring to the drawings, A designates a glass-annealing furnace or leer having an annealing oven or chamber $a$, which (see Figs. 1, 2, and 3) is open at its rear and ware-discharging end and closed at its opposite or forward end by suitably-applied doors $a'$, as shown in Fig. 1. One of the side walls of the chamber $a$ a short distance rearward from the doors $a'$ is provided (see Figs. 2 and 3) with a lateral doorway or inlet I, through which the ware which is to be annealed is fed into the chamber $a$.

Within the chamber $a$ between the inlet I and the doors $a'$ are two gas-burners B, (see Figs. 1 and 2,) arranged near opposite side walls, respectively, of the said chamber and connected and communicating with a gas-supply pipe $B'$, which is provided with a normally closed valve $B^2$. The burners B are preferably so arranged relatively that the discharge-orifices $b$ of each burner discharge opposite to and toward the discharge-orifices of the other burner, so that the flames $b'$ issuing from each burner during the operation of the burners will project toward the flames issuing from the other burner, as shown in Fig. 1. Heat is therefore supplied during the operation of the burners B to the chamber $a$ at the ware-receiving or forward end of the said chamber between the inlet I and the forward extremity of the furnace.

The bottom of the chamber $a$ is largely formed by an endless belt or conveyer $c$, which is arranged horizontally and extends longitudinally of the said chamber and, as shown in Figs. 1, 2, and 3, comprises two chains C and C, which are arranged a suitable distance apart widthwise of the chamber $a$ and at the ware-discharging or rear end of the said chamber lead (see Figs. 1 and 2) over and operatively engage corresponding sprocket-wheels $C'$, which are operatively mounted on a shaft $C^2$, arranged horizontally below and crosswise of the furnace. The said conveyer extends past the inlet I, and the chains C at the ware-receiving or forward end portion of the chamber $a$ (see Figs. 1, 2, and 3) lead over corresponding sprocket-wheels $C^3$, arranged a suitable distance apart and mounted upon a shaft $C^4$, which is arranged horizontally below the said chamber and crosswise of the furnace. The shafts $C^2$ and $C^4$ are parallel and supported from the stationary framework of the furnace, and the wheels of both pairs of sprocket-wheels $C'$ and $C^3$ are spaced apart correspondingly and arranged in line axially. The chains C carry metal plates $C^5$, which are arranged horizontally and form the bottom and extend crosswise of the chamber $a$. The plates $C^5$ are attached to the chains C in any approved manner.

A suitably-supported driving-shaft D (see Figs. 1, 2, and 3) is arranged horizontally a suitable distance above and crosswise of the top of the furnace A and a suitable distance rearwardly of the path of the ware into the oven or chamber $a$. The shaft D is arranged parallel with the shafts $C^2$ and $C^4$. The shaft D is provided at one end with a driving-wheel $D'$, to which power is applied in any approved manner. The shaft D is provided near its end which is farther from the inlet I (see Fig. 1) with a pinion $D^2$, which is loosely mounted on the said shaft. The pinion $D^2$ meshes with a gear $F^2$, operatively mounted on a crank-shaft F, which is parallel with and arranged and supported above the furnace and a suitable distance rearwardly of the shaft D.

The means employed to control operative connection between the pinion $D^2$ and the shaft D comprises a clutch comprising a member $D^4$, slidably mounted on the shaft D, and a relatively stationary member $D^3$, formed on the pinion $D^2$. The operative connection between the shaft D and the slidable clutch member $D^4$ comprises, preferably, the well-known means of groove and feather, as at $d^4$, as shown very clearly in Figs. 4 and 5. A collar $D^5$, mounted on and fixed to the shaft D, is arranged as required to prevent displacement of the said pinion endwise of the shaft farther from the slidable clutch member $D^4$. The clutch member $D^4$ (see Figs. 4 and 5) is provided with an annular groove $D^6$, which is engaged by the fork $d^6$ of a forked lever $d$, applied and operated as will hereinafter appear.

The crank-shaft F projects a suitable distance beyond the ware-receiving side of the furnace A and is provided at the said side of the furnace with a crank $f$, which (see Figs. 1 and 2) is operatively connected by a pitman or rod $g$ with an upright lever G, which is fulcrumed, as at $a^2$, horizontally and parallelly with the shaft $C^2$ to a bracket $A^2$, projecting from and rigid with the adjacent side wall of the chamber $a$ at the rear and ware-discharging end of the chamber $a$ suitable distance above the shaft $C^2$. The lever G is provided below its fulcrum with a segment-gear $G'$, which meshes with a segment-gear $G^2$, loosely mounted on the shaft $C^2$. The segment-gear $G^2$ is provided (see Fig. 7) with two pawls $G^3$ and $g^3$, pivoted, as at $g^2$, to the said gear horizontally and parallelly with the shaft $C^2$. The pawls $G^3$ and $g^3$ are arranged a suitable distance apart circumferentially of a ratchet-wheel $G^5$, which is operatively mounted on the shaft $C^2$. The said pawls $G^3$ and $g^3$ engage notches between teeth of the said ratchet-wheel and project in opposite directions, respectively. The arrangement of the said pawls relative to the said ratchet-wheel is such that when one of the said pawls is in full engagement with the engaging notch in the ratchet-wheel the other of the said pawls is only half-way in the opposing notch of the said wheel.

The driving-shaft D is rotated in the direction indicated by the arrow placed thereon in Fig. 1, and obviously the ware-feeding conveyer $c$ of the annealing-chamber is, upon establishing operative connection between the pinion $D^2$ and the shaft D, actuated in the direction required to convey any ware upon the conveyer toward the discharging or rear end of the said chamber. The articles or pieces of ware to be annealed are introduced through the inlet I into the said chamber to and upon the said conveyer, which has two of its plates $C^5$ when the conveyer is at rest in position to receive ware or articles to be annealed, as shown in Fig. 9, and the said inlet is large enough longitudinally of the furnace to accommodate the passage of two pieces of ware or articles to be annealed side by side and simultaneously through the said inlet onto the different plates $C^5$, respectively, which are in position, as aforesaid, to receive the said articles or ware. Each plate $C^5$ of the said conveyer has the dimensions required to accommodate the arrangement thereon longitudinally of a row of the articles or pieces of ware to be annealed and one article or piece widthwise of the plate. The said conveyer is actuated intermittently, being moved every time two plates $C^5$ have been laden with a row of articles or pieces of ware far enough to remove the last-laden pair of plates of the said conveyer from opposite the inlet I toward the rear end of the chamber $a$ and to bring the next succeeding and unladen pair of plates $C^5$ of the said conveyer opposite the said inlet and in position to receive ware fed into the said chamber through the said inlet.

We would here remark that by the provision and hereinbefore-described arrangement of two pawls $G^3$ and $g^3$ the desired accuracy in the intermittent actuations of the ware-feeding conveyer of the annealing-chamber is attained without the necessity of employing a ratchet-wheel having unduly fine teeth. We would also remark that the wrist $f'$ of the crank $f$ is preferably adjustable radially of the crank, and the said wrist (see Figs. 1 and 2) is shown engaging a slot $f^2$, which is formed in and radially of the said crank, and the wrist is clamped or secured in the desired adjustment in any approved manner.

The bottom of the inlet I (see Figs. 8, 9, and 10) is formed by a shelf or table $h$, which extends from outside of the furnace into the annealing-chamber $a$, and closely overhangs the upper or ware-receiving surface of the conveyer $c$ without, however, interfering with the operation of the said conveyer. The table $h$ is arranged and adapted to receive the ware to be annealed preparatory to the passage of the said ware through the inlet I into the chamber $a$ and onto the said conveyer. A pair of articles or pieces of ware $w$ to be annealed are shown delivered to and upon the table $h$ side by side longitudinally of the furnace and in position to be shoved or moved laterally through the inlet I onto the said conveyer. The table $h$ is provided with a stop-forming upright wall $h'$ adjacent to the inner side wall of the inlet I and in position to prevent the ware placed upon the said table as aforesaid from being displaced rearwardly from the table.

The means employed for removing the pair of articles or pieces of ware to be annealed from the table $h$ into the annealing-chamber $a$ through the inlet I (see Figs. 1, 2, and 3) comprises, preferably, an endless conveyer $k$, which consists of two parallel endless chains or carriers K, arranged a suitable distance apart longitudinally of the furnace and provided at their outer sides with wings $K'$, projecting laterally and outwardly from the said chains and arranged perpendicularly to and equidistantly longitudinally of the chains. Each wing $K'$ is secured to both chains K. The chains K lead through the upper portion of the inlet I and horizontally through and crosswise of the annealing-chamber $a$ in under corresponding sprocket-wheels $K^2$, supported from the side walls of the said chamber. The said chains K lead over corresponding sprocket-wheels $K^3$, supported from a standard $A^3$, mounted on top of the furnace adjacent the inlet I, and lead also over corresponding sprocket-wheels $L'$, operatively mounted upon a shaft L, which is arranged horizontally and longitudinally of the furnace between the driving-shaft D and the forward extremity of the furnace adjacent and a suitable distance from the pinion $D^2$. The wings $K'$ have the arrangement and dimensions required to engage both pieces of ware placed upon the table $h$ at the outer side of the ware and to feed and pass with the said ware through the inlet I into the annealing-chamber $a$. The said wall of the said chamber opposite the inlet I is apertured, as at J, (see Figs. 1 and 3,) to accommodate the location and operation of the said conveyer. It will be observed, therefore, that the conveyer $k$ travels over and crosswise of the conveyer $c$ and that adjacent wings $K'$ of the conveyer $k$ are arranged far enough apart to accommodate the location between them of an article or piece of ware to be annealed. The conveyer $k$ is actuated intermittently and far enough during each actuation thereof to remove the ware delivered upon the said table into the inlet I of the annealing-chamber. It is evident also that the conveyer $k$ arranges the ware delivered thereby to the annealing-chamber $a$ in rows formed upon and arranged transversely of the conveyer $c$ and that the wings $K'$ of the conveyer $k$ prevent falling or jarring of adjacent pieces of ware against each other next preparatory to and during the feeding of the said ware into place upon the conveyer C and that each piece of ware to be fed into place upon the said conveyer C is moved during successive actuations of the conveyer $k$ until the said piece of ware has arrived in its place upon the conveyer $c$. For instance, the pieces of ware delivered to the table $h$ are first fed from the said table into the inlet I of the annealing-chamber and thence moved from within the said inlet onto the conveyer $c$. By the apparatus illustrated ten pieces of ware are adapted to be arranged in a row upon and crosswise of the conveyer $c$, and obviously in forming the said row the first member of the row and each member of the row between the first and last members of the row are moved with and during each movement of the next succeeding member of the said row, and all members of the said row are in their proper place upon the conveyer $c$ when the last member of the said row has been delivered onto the said conveyer. It is obvious also that adjacent members of each row of ware being formed on the conveyer $c$ are kept separated by a wing $K'$ of the conveyer $k$ until the conveyer $c$ has been actuated to remove the members of the said row of ware from between wings $K'$ of the conveyer $k$ upon the completion of the formation of the said row. Obviously, therefore, falling or jarring of adjacent members of each row of ware during the formation of the said row and upon the commencement of the actuation of the conveyer $c$ to remove the said ware out of the way of the next succeeding row or rows of ware to be formed is avoided and every piece of ware to be annealed is removed from the table $h$ through the inlet I into and through the annealing-chamber $a$ without liability of being broken or cracked or mutilated. The chains K, to prevent their sagging within the annealing-chamber $a$ in their passage through the said chamber, rest upon horizontally-arranged flanges $e$ of a metal bar E, which (see Figs. 3 and 8) extends crosswise of the said chamber and is suitably supported from the side walls of the chamber. To prevent backlash of the conveyer $k$ and to avoid jarring of the ware which has been fed or is about to be fed by wings $K'$ of the said conveyer, one of the sprocket-wheels $K^3$ is engaged by a pawl $k^3$, which, as shown in Fig. 3, is arranged at the bottom of the respective wheel and pivotally supported from the standard $A^3$, and a suitably-applied weight $K^4$, with which the said pawl is provided, acts to retain the said pawl in engagement with the said wheel.

The means employed in intermittently actuating the conveyer $k$ (see Figs. 1, 2, and 3) comprises mechanism for intermittently transmitting power from the driving-shaft D to the sprocket-wheel bearing-shaft L, which is operatively provided at its forward end and forward of the said conveyer with a ratchet-wheel $L^2$, engaged on top by a pawl $l^2$, which is operatively connected with a crank $l'$ of a crank-shaft $l$, arranged horizontally and parallelly with the shaft L, and consequently at a right angle to the driving-shaft D, but adjacent to the inlet I of the annealing-chamber and between the upper and lower portions of the conveyer $k$. Preferably the rod $l^3$, which is journaled at one end upon the wrist $l^4$ of the crank $l'$ and instrumental in transmitting power from the said crank, is provided at its opposite end with the pawl $l^2$, and the said rod therefore extends crosswise of the furnace forward of the conveyer $k$. The wrist $l^4$ is preferably adjustable radially of the crank. The wrist $l^4$ is shown engaging a slot $l^5$, formed in and arranged radially of the crank $l'$ and clamped or secured in the desired adjustment in any approved manner. The crank-shaft $l$ is operatively provided at its rear end and in suitable proximity to the driving-shaft D with a bevel-gear $l^7$, which is in mesh with a bevel-gear $D^7$, loosely mounted upon the last-mentioned shaft. A clutch for controlling operative connection between the gear $D^7$ and the shaft D is provided. One member $d^7$ of this clutch is formed on the gear $D^7$, whereas the companion clutch member M is operatively and slidably mounted on the shaft D. The operative connection between the clutch member M and the shaft D comprises, preferably, the well-known means of groove and feather, as at M'. (See Fig. 11.) A collar $D^8$, mounted on and fixed to the shaft D, (see Fig. 1,) is arranged as required to prevent displacement of the gear $D^7$ endwise of the shaft farther from the movable clutch member M.

The clutch member M is provided with an external annular groove $M^2$, engaged by the fork $m^2$ of a forked lever $m$, which is arranged longitudinally of and above the furnace A and vertically fulcrumed at its rear end, as at $m'$, to the top of the furnace. The lever $m$ is provided below the shaft D with a forwardly-projecting arm $m^3$, which is arranged parallel with and at an elevation below the shaft $l$. The arm $m^3$ (see Figs. 8 and 11) is provided interiorly with a chamber $m^4$, which extends longitudinally of the said arm and is open at the forward or outer end of the arm. A bar $n$ is arranged centrally and longitudinally of the chamber $m^4$ and shiftable endwise of the lever-arm $m^3$. The bar $n$ is provided externally with a collar $n'$, which slidably fits within the chamber $m^4$, and a spiral spring $n^2$ is mounted and confined upon the bar $n$ between the collar $n'$ and the inner end wall $m^5$ of the chamber $m^4$ and acts to retain the said bar in its normal and operative position wherein it projects, as shown in Figs. 1, 3, 8, and 11, beyond the outer or free end of the lever-arm $m^3$ into the sweep of an arm $l^8$, with which the shaft $l$ is operatively provided between the shaft D and the conveyer $k$. The spring $n^2$ acts to retain the bar $n$ in its normal and operative position, wherein the said bar engages the shaft-arm $l^8$ and prevents the revolving of the said arm in the direction in which the shaft $l$ is to be rotated to actuate the conveyer $k$ in the required direction. The bar $n$ is operatively connected at its inner end with a lever N, which is arranged horizontally above and crosswise of and supported from the top of the furnace A between the shaft D and the conveyer $k$. The lever N is fulcrumed vertically, as at N', at any suitable point between its ends. The lever-arm $m^3$ is slotted or cut away at the bottom, as at $m^6$, (see Fig. 11,) to accommodate the connection of the bar $n$ with the lever N, and the bar $n$ obviously extends through and has bearing in the wall $m^5$ between slot $m^6$ and the chamber $m^4$, which wall, as already indicated, constitutes the inner end wall of the said chamber. A spiral spring Q is mounted and confined upon the shaft D between the clutch member M and a collar Q', fixed upon the said shaft. The spring Q acts to retain the clutch member M in engagement with the companion and relatively stationary clutch member $d^7$; but in the normal position of the parts the clutch member $m$ is, as shown in Fig. 1, held out of operative engagement with the clutch member $d^7$ by the coöperating shaft-arm $l^8$ and bar $n$ against the action of the said spring. It will be observed, therefore, that the shaft-arm $l^8$ and the bar $n$ constitute means for retaining the movable clutch member $m$ in its normal and inoperative position and for interrupting the rotation of the shaft $l$. Obviously the lever N is actuated in the direction required to shift the bar $n$ endwise out of engagement with the said shaft-arm against the action of the spring $n^2$ to render the clutch member M free to be moved by the spring Q into operative engagement with the clutch member $d^7$, so as to establish operative connection between the gear $D^7$ and the driving-shaft D and result in the transmission of power from the said shaft to the conveyer $k$. The release of the shaft-arm $l^8$ by the bar $n$ also renders the shaft free to be rotated in the direction required to effect the actuation of the conveyer $k$ in the required direction.

The lever N is operatively connected at its outer end with the upper arm of an upright lever P, which is arranged externally of the furnace a suitable distance rearwardly of the table $h$. The lever P is fulcrumed, as at P', at any suitable point between its ends horizontally and at a right angle to the axis of the lever N. A poise $P^2$, with which the lower arm of the lever P is provided, acts to retain the said lever in its normal position. An endwise-shiftable bar $p$, arranged externally and longitudinally of the furnace, is operatively connected at its rear end with the lower arm of the lever P. The bar $p$ extends, therefore, forwardly of the lever P to and under the table $h$, and a pin or member $a^4$, projecting from and rigid with the adjacent wall of the annealing-chamber, engages a slot $p'$, formed in and extending longitudinally of the said bar. (See Figs. 8, 9, 10, 12, 13, and 14.) The central portion of the slot $p'$ is inclined, having an upward trend, as at $p^2$, in the direction of the forward and free end of the bar. In the normal position of the parts the pin or projecting member $a^4$ is in engagement with the rear end of the slot $p'$, as shown in Figs. 8, 12, and 14. Upon pushing rearwardly upon the forward end of the bar $p$ the lever P is actuated in the direction required to result in the disengagement of the bar $n$ from the shaft-arm $l^8$, and the walls of the inclined portion $p^2$ of the slot $p'$ during the said rearward movement of the said bar will be engaged by the stationary pin or projecting member $a^4$ and effect a downward tilting of the said bar.

The bar $p$ is operated by means employed in delivering ware to the table $h$, and the said ware-delivering means, as shown in Figs. 1, 8, 9, and 10, comprises a suitably-supported endless track T, which is arranged in a horizontal plane at an elevation below and extends in under the table $h$. The said track (see Figs. 1, 2, and 3) extends rearwardly of the table $h$ around a sprocket-wheel R', which is operatively mounted upon a suitably-supported vertically-arranged shaft $R^2$, operatively provided below the said wheel with another sprocket-wheel $R^3$, which is operatively connected by a chain $R^4$ with a sprocket-wheel $R^5$, operatively mounted upon a suitably-supported vertically-arranged shaft $R^6$, arranged below the driving-shaft D and intergeared with the last-mentioned shaft, as at $R^7$. The track T at the place from which the ware to be annealed is to be conveyed to the table $h$ extends around a sprocket-wheel $R^8$, mounted (see Figs. 1 and 2) upon a suitably-supported vertically-arranged axle $R^9$. An endless chain or carrier R operatively engages the sprocket-wheels R' and R⁹ and lies in a channel $t$, formed in and centrally widthwise of the track. The channel $t$ extends longitudinally of the track T.

A carriage employed in conveying ware to be annealed to the table $h$ rests upon the track T and is propelled by the chain R. The said carriage comprises a body portion $r$, which is attached to the chain R in any approved manner and rests upon the track T. The said carriage comprises also a platform $u$, which is pivotally mounted on the body portion $r$, being pivoted, as at $u'$, horizontally to and transversely of the said body portion. The platform $u$ normally and unladen inclines upwardly in the direction opposite to the direction in which the chain R is actuated, as shown in Fig. 14, and the body portion $r$ is provided (see Figs. 8 and 9) with a stop-forming member $r'$, arranged to limit the tilting of the platform. The platform $u$ is swung into a horizontal position, as shown in Figs. 8, 10, 12, and 13, by a load placed upon the platform, and the platform in its horizontal position lies largely upon the body portion $r$. In Figs. 8, 10, 12, and 13 two jars $w$ are shown upon the platform $u$. The platform $u$ is provided with several vertically-arranged upwardly-projecting flanges $u^2$, which extend longitudinally and from end to end of the platform and project upwardly slightly above the horizontal plane in which the ware-receiving upper surface of the table $h$ is arranged, and the said table and its upright wall $h'$ are slotted, as at $h^2$, to avoid obstructing the path of the platform $u$ during the propulsion of the ware-conveying carriage upon and along the track T. It will be observed, therefore, that the wall $h'$ not only forms a guard to prevent displacement of ware rearwardly from the table $h$, but also constitutes a web which connects the different portions of the table together and permits of the provision of the table with the slots $h^2$. The platform $u$ is provided with a laterally-projecting horizontal pin or member $u^3$, in position when the platform is laden to come into engagement with the forward end of the bar $p$, as shown in Figs. 8, 10, and 12, which bar projects into the path of the pin or member $u^3$ when the platform $u$ is laden. The pin or member $u^3$, when the platform $u$ is unladen and tilted, as shown in Fig. 14, is arranged to pass over the bar $p$ without resulting in the actuation of the said bar. The table $h$ is recessed in its under side, as at $h^3$, to accommodate the location of the pin or member $u^3$. Obviously the rearward actuation of the bar $p$ brings the inclined portion $p^2$ of the slot $p'$ into engagement with the stationary pin or member $a^4$ and tilts the said bar downwardly, as shown in Fig. 13, so as to permit the said member $u^3$ to pass over the said bar after having actuated the bar endwise and rearwardly the distance required to disengage the bar $n$ from the shaft-arm $l^8$.

The track T is provided at the sides with upwardly-projecting flanges $t'$, which extend longitudinally of the track between the sprocket-wheels R' and R⁸ and form side guides for the body portion $r$ of the ware-conveying carriage. The inner portion of the track T is cut away, as at $t^2$, adjacent the sprocket-wheels R' and R⁸, as shown in Figs. 1, 8, 9, and 10.

Referring again to the means employed in controlling the operation of the clutch member D⁴, it will be observed (see Figs. 1, 4, and 5) that the lever $d$ is arranged above and longitudinally of the furnace A between the shaft D and the conveyer $k$ and fulcrumed vertically, as at $d'$, to the furnace-top. The lever $d$ is provided above the shaft D and at its upper side with a slideway $d^2$, arranged longitudinally of the furnace and at a right angle to the said shaft. The slideway $d^2$ is engaged by a correspondingly-arranged slide $s$, which is provided on top with an upwardly-projecting pin or member $s'$, which engages a slot $v'$, formed in and extending vertically through the rear arm of a lever $v$, which is fulcrumed vertically centrally between its ends and over the lever $d$, preferably by the same pin $d'$, which forms the fulcrum of the last-mentioned lever. The slot $v'$ is arranged diagonally and trends forwardly and in the direction of the ware-receiving inlet of the annealing-chamber, and the pin or member $s'$ normally engages the rear end of the said slot. The lever $v$ is arranged longitudinally of the furnace, and the forward arm of the said lever projects into the path of the cam-forming member $x^2$ of the cam-wheel $x'$, which is operatively mounted on a suitably-supported shaft $x$, which is arranged horizontally over the furnace parallelly with the shaft D and between the last-mentioned shaft and the conveyer $k$. The shaft $x$ is operatively provided with a bevel-gear $x^3$, which meshes with a bevel-pinion L³, operatively mounted on the shaft L. The slide $s$ is provided at its rear end and at one side with a roller or laterally-projecting member $s^2$, arranged to be engaged by a cam F', which is formed upon the gear-wheel F² of the shaft F. The slide $s$ is provided in its rear portion with a slot $s^3$, which extends vertically through the slide. The rear end wall of the slot $s^3$ is engaged by the upper arm of an upright lever $y$, which is arranged to swing in a vertical plane and is fulcrumed, as at $y'$, at any suitable point between its ends to the lever $d$ horizontally and transversely of the path of the slide below the said path. The lower arm of the lever $y$ projects rearwardly and is weighted, as at $y^2$. In the normal position of the parts the cam F' of the gear-wheel F² is in position engaging the projecting member $s^2$ of the slide $s$ and holds the lever $d$ in the position required to retain the movable clutch member $d^4$ out of operative engagement with the relatively stationary clutch member D³ against the action of a spring W, which is mounted and confined upon the driving-shaft D between the inner end of the clutch member $D^4$ and a collar W', which is mounted on and fixed to the shaft D. It will be observed, therefore, that the spring W acts to retain the clutch member $D^4$ in engagement with the clutch member $D^3$, that the weighted lever $y$ acts to retain the slide $s$ in position with its projecting member $s^2$ in the path of the cam F' of the gear-wheel $F^2$, and that the rear end wall of the slot $v'$, which wall is normally engaged by the pin or member $s^2$ of the slide $s'$, forms a stop to limit the movement of the said slide in the direction of the shaft F.

The different parts of the hereinbefore-described ware-feeding apparatus are so relatively arranged and timed that the operation of the said apparatus is as follows: Two jars or pieces of ware $w$ are placed upon the tilting platform $u$ of the ware-conveying carriage. The chain R is actuated in the direction indicated by the arrow placed thereon in Figs. 1, 8, 9, 12, 13, and 14, and the ware-conveying carriage is therefore propelled along the track T and passes during its travel on and along the said track through the slots $h^2$ in the table $h$, and the pieces of ware are arrested by the stop-forming member $h'$ of the said table during the passage of the aforesaid carriage through the slots $h^2$ in the table and left upon the table side by side longitudinally of the furnace, as illustrated in Figs. 8, 9, 12, and 13, in position to be fed into the annealing-chamber $a$ and to form a member of different rows of ware to be formed on and transversely of the conveyer $c$. The platform $u$, if without a load and being normally tilted, as illustrated in Fig. 14, will not result in the actuation of the mechanism employed in disengaging the bar $n$ from the shaft-arm $l^8$; but the platform when laden, and therefore arranged in a horizontal position, as shown in Figs. 8, 9, and 12, will come into engagement with and actuate the said mechanism as required to render the bar $n$ inoperative and permit the spring Q to actuate the movable clutch member M into operative engagement with the relatively stationary clutch member $d^7$, and thereby establish operative connection between the driving-shaft D and the mechanism employed to operate the conveyer $k$. The crank-shaft $l$, which forms a member of the mechanism employed in the actuation of the conveyer $k$, makes only one complete rotation at a time, and during the said rotation the conveyer $k$ is actuated in the required direction to feed ware arranged between wings K' of the said conveyer a distance equaling the spacing apart of the said wings—that is, the movable clutch member M when rendered operative remains in operative engagement with the relatively stationary clutch member $d^7$ long enough to effect a complete rotation of the crank-shaft $l$; but at the end of the said rotation the walls of the inclined portion $p^2$ of the slot $p'$ in the bar $p$ have resulted in releasing the said bar from the pin or projecting member $u^3$ of the platform $u$, and the mechanism instrumental in the operation of the bar $n$ automatically returns into its normal position by the action of the spring $n^2$ and the poise $P^2$ of the lever P, and the shaft-arm $l^8$ will have come into engagement with the bar $n$ and just completed the actuation of the clutch-lever $m$ in the required direction to render the movable clutch member M inoperative against the action of the spring Q. The actuation of the conveyer $k$ will have resulted in the transmission of power to the cam-wheel $x'$, which is intermittently actuated as many times in order to make a complete rotation as the conveyer $k$ is actuated in feeding and arranging ware to be annealed in forming a row of ware within the annealing-chamber $a$. If therefore ten pieces of ware are formed in a row upon the conveyer $c$ and the gear $x^3$ on the cam-shaft $x$ has twice the diameter of the engaging pinion $L^3$ on the shaft L, the coöperating ratchet-wheel $L^2$ and pawl $l^2$ must be arranged and timed to actuate the conveyer $k$ five times to effect one complete rotation of the shaft $x$. The cam-forming member $x^2$ of the cam-wheel $x'$ once during each complete rotation of the said wheel operates the lever $v$, which during its operation by the said cam-wheel shifts the slide $s$ against the action of the weight $y^2$ and forwardly or in the direction required to disengage the projecting member $s^2$ of the said slide from the cam F' of the gear $F^2$ and free the movable clutch member $D^4$, which through the medium of the slide $s$ and the cam F' of the gear $F^2$ is normally held in its inoperative position against the action of the spring W. Obviously, therefore, the release of the clutch member $D^4$ by the cam F' renders the said clutch member free to be actuated by the said spring W into operative engagement with the companion and relatively stationary clutch member $D^3$. In Fig. 6 the parts are shown in position releasing the clutch member $D^4$ preparatory to the actuation of the said clutch member into operative engagement with the clutch member $D^3$ as required to establish operative connection between the crank-shaft F and the driving-shaft D. It will be observed, therefore, that upon the actuation of the conveyer $k$ as many times as required to feed into place upon the conveyer $c$ as many articles or pieces of ware to be annealed as are required to form a row upon the said conveyer $c$ power is transmitted to the crank-shaft F, and the parts are so arranged and timed that during the rotation of the said shaft F the conveyer $c$ shall through the medium of the crank $f$, pitman $g$, lever G, segment-gears G' and $G^2$, ratchet-wheel $G^5$, and the one or the other of the pawls $G^3$ and $g^3$ be actuated the distance required to convey ware from between the wings K' of the conveyer $k$ in the direction of the rear and discharging end of the annealing-chamber out of the way of the next succeeding ware to be fed into the said chamber. The cam F' upon each actuation of the conveyer $c$ again comes into engagement with the projecting member $s^2$ of the slide $s$ and actuates the said slide and connected lever $d$ in the direction required to disengage the movable clutch member $D^4$ from the relatively stationary clutch member $D^3$ against the action of the spring W.

What we claim is—

1. The combination, with an annealing-chamber having an inlet for receiving the ware to be annealed, of an endless track arranged externally of the annealing-chamber and extending by the aforesaid inlet at the bottom of the inlet, which track is provided with a channel extending longitudinally of the track and open at the top; an endless carrier engaging the said channel and extending along the track and comprising a carriage resting on the track, and means for actuating the carrier.

2. The combination, with an annealing-chamber having a ware-receiving inlet, of an endless track arranged externally of the annealing-chamber and extending by the aforesaid inlet at the bottom of the inlet, which track is provided with a channel extending longitudinally of the track and open at the top; an endless chain lying in the said channel and extending along the track; a carriage resting on the track and attached to the chain, and means for actuating the chain.

3. The combination, with an annealing-chamber having a ware-receiving inlet, of an endless track arranged externally of the annealing-chamber and extending by the aforesaid inlet at the bottom of the inlet, which track is provided with a channel extending longitudinally of the track and open at the top; an endless carrier engaging the aforesaid channel and extending along the track and comprising a carriage resting on the track; side guides on the track for the said carriage, which guides extend longitudinally of the track, and means for actuating the carrier.

4. The combination, with an annealing-chamber provided, at its forward end and at one side, with an inlet for receiving ware to be annealed, of a shelf or table arranged to receive the ware at the outer side of the said inlet; an upright shaft rearward of the said table; means for rotating the shaft; a sprocket-wheel operatively mounted on the shaft at an elevation below the table; an endless chain operatively engaging the said wheel and extending in under the table; a carriage attached to the said chain and arranged to convey ware to the table during the actuation of the chain, and a track extending along the chain and affording bearing to the carriage.

5. The combination, with an annealing-chamber provided, at its forward end and at one side, with an inlet for receiving ware to be annealed, of two sprocket-wheels arranged with their axes vertically and located forwardly and rearwardly of the said inlet externally of the annealing-chamber; an endless chain operatively engaging the said wheels; a carriage attached to the said chain and arranged to convey ware to the aforesaid inlet during the actuation of the chain; a track extending along the chain and affording bearing to the carriage, which track is provided, between the aforesaid wheels, with upwardly-projecting flanges forming side guides for the carriage during the actuation of the chain, and means for transmitting power to one of the aforesaid wheels.

6. The combination, with an annealing-furnace having an annealing-chamber provided, at its forward end and at one side, with an inlet for receiving ware to be annealed, of a shelf or table arranged to receive ware to be fed through the said inlet and provided with a forwardly-facing stop-forming wall adjacent the rear side wall of the said inlet; a carrier extending in under and rearwardly of the said table and comprising a carriage having a ware-receiving platform which is provided with laterally-spaced seat-forming flanges which extend longitudinally of the platform and project upwardly above the horizontal plane in which the upper surface of the table is arranged, and the said table and its stop-forming wall being slotted to accommodate the location of the platform during the actuation of the carrier.

7. The combination, with an annealing-furnace having an annealing-chamber provided with a ware-receiving inlet, of a shelf or table arranged to receive ware to be delivered to the said inlet; a track extending in under and rearwardly of the said table; an endless carrier extending along the said track and comprising a carriage having a ware-receiving platform which is provided with laterally-spaced seat-forming flanges which extend longitudinally of the platform and project upwardly above the horizontal plane in which the upper surface of the table is arranged, and the said table being slotted to accommodate the location of the platform during the actuation of the carrier.

8. The combination, with an annealing-chamber provided, at one side, with an inlet for receiving ware to be annealed, of a conveyer extending through the said inlet and transversely of and through the aforesaid chamber, which conveyer has ware-feeding wings arranged transversely of the conveyer and suitably spaced longitudinally of the conveyer, and means for intermittently actuating the said conveyer.

9. The combination, with an annealing-chamber provided, at one side, with a ware-receiving inlet, of an endless conveyer extending through the said inlet and transversely of and through the aforesaid chamber and provided with ware-feeding wings arranged transversely and suitably spaced longitudinally of the conveyer, and means for actuating the said conveyer.

10. The combination, with an annealing-chamber provided, at one side, with an inlet for receiving ware to be annealed, of a conveyer extending through the said inlet and transversely of and through the aforesaid chamber, which conveyer is provided with wings arranged transversely of the conveyer and suitably spaced longitudinally of the conveyer; means for actuating the said conveyer, and a carrier for conveying ware to and between adjacent wings of the aforesaid conveyer.

11. The combination, with an annealing-furnace having an annealing-chamber provided, at one side, with a ware-receiving inlet, and a table arranged to receive the ware to be annealed adjacent and outside of the said inlet, of an endless conveyer extending through the said inlet and transversely of and through the aforesaid chamber and extending also over and crosswise of the top of the furnace, which conveyer is provided with outwardly-projecting wings arranged transversely of the conveyer, which wings are suitably spaced longitudinally of the conveyer, and means for actuating the conveyer, and the arrangement of the parts being such that ware is shoved from off the aforesaid table into the annealing-chamber by the aforesaid wings during the operation of the said conveyer.

12. The combination, with an annealing-chamber provided, at one side, with a ware-receiving inlet, and a table arranged to receive the ware to be annealed adjacent and outside of the said inlet, of an endless conveyer extending over the said table and through the said inlet and transversely of the aforesaid chamber and extending also over and crosswise of the top of the furnace, which conveyer is provided with outwardly-projecting wings arranged transversely of the conveyer, which wings are suitably spaced longitudinally of the conveyer; means for intermittently actuating the conveyer, and means whereby ware is carried and delivered to the aforesaid table between adjacent wings of the said conveyer.

13. The combination, with an annealing-chamber provided, at one side, with an inlet for receiving ware to be annealed, of an endless conveyer extending through the said inlet and transversely of and through the annealing-chamber, which conveyer comprises two parallel endless chains provided with ware-feeding wings attached to the chains and arranged transversely of the conveyer, which wings are suitably spaced longitudinally of the chains, and means for preventing sagging of the chains within the annealing-chamber.

14. The combination, with an annealing-chamber provided, at one side, with a ware-receiving inlet, of an endless conveyer extending through the said inlet and transversely of and through the annealing-chamber, which conveyer comprises two parallel endless chains provided with ware-feeding wings attached to the chains and arranged transversely of the conveyer, which wings are suitably spaced longitudinally of the chains, and a stationary bar arranged within and extending transversely of the annealing-chamber and having flanges arranged below and affording bearing to the aforesaid chains.

15. The combination, with an annealing-furnace having an annealing-chamber provided, at one side, with a ware-receiving inlet, of an endless conveyer extending through the said inlet and transversely of and through the annealing-chamber and over and crosswise of the top of the furnace, which conveyer is provided, at its outer side, with outwardly-projecting wings arranged transversely of the conveyer and spaced longitudinally of the conveyer; means for actuating the conveyer and comprising a crank-shaft, and means whereby the crank-shaft is intermittently rotated.

16. The combination, with an annealing-furnace having an annealing-chamber provided, at one side, with a ware-receiving inlet, of an endless conveyer extending through the said inlet and transversely of and through the aforesaid chamber, which conveyer extends also over and crosswise of the top of the furnace and is provided with outwardly-projecting wings arranged transversely of the conveyer, which wings are suitably spaced longitudinally of the conveyer; a shaft arranged above the furnace and transversely of the path of the conveyer between the upper and lower portions of the conveyer and operatively connected with the conveyer; a ratchet-wheel operatively mounted on the said shaft; a pawl engaging the ratchet-wheel, and a crank-shaft arranged transversely of the path of the conveyer above the furnace and between the upper and lower portions of the conveyer and having its crank operatively connected with the pawl, and means for operating the crank-shaft.

17. The combination, with an annealing-chamber provided, at one side, with a ware-receiving inlet, of an endless conveyer extending through the said inlet and transversely of the aforesaid chamber, which conveyer comprises parallel endless chains provided with ware-feeding wings arranged transversely of the conveyer, which wings are suitably spaced longitudinally of the conveyer; a shaft arranged transversely of the path of the conveyer and operatively provided with sprocket-wheels operatively engaging the chains, and means for intermittently rotating the said shaft.

18. The combination, with an annealing-chamber provided, at one side, with a ware-receiving inlet, and a conveyer extending through the said inlet and transversely of the aforesaid chamber and having outwardly-projecting wings arranged transversely and suitably spaced longitudinally of the conveyer; of an intermittently-rotated shaft operatively provided with a bevel-gear; mechanism for transmitting motion from the said shaft to the conveyer and arranged to be operated once during each rotation of the said shaft; a driving-shaft; a bevel-gear loosely mounted on the driving-shaft and meshing with the aforesaid bevel-gear, and a clutch for controlling operative connection between the loosely-mounted gear and the driving-shaft.

19. The combination, with an annealing-chamber provided, at one side, with a ware-receiving inlet, and a conveyer extending through the said inlet and transversely of the aforesaid chamber and having ware-feeding wings arranged transversely and suitably spaced longitudinally of the conveyer, of an intermittently-rotated shaft having a laterally-projecting arm; means for transmitting motion from the said shaft to the conveyer and arranged to be operated once during each rotation of the shaft; a shiftable stop-forming bar or member normally arranged in the path of the aforesaid shaft-arm; means acting to retain the said stop-forming member in the said path, and means for actuating the said stop-forming member out of the said path.

20. The combination, with an annealing-chamber provided, at one side, with a ware-receiving inlet, and a conveyer extending through the said inlet and transversely of the aforesaid chamber and having ware-feeding members spaced longitudinally of the conveyer, of an intermittently-rotated shaft having a laterally-projecting arm; mechanism for transmitting motion from the said shaft to the conveyer; a driving-shaft; a gear loosely mounted on the driving-shaft and operatively connected with the aforesaid intermittently-rotated shaft; a clutch for controlling operative connection between the gear and the driving-shaft and comprising a clutch member operatively and slidably mounted on the driving-shaft and a relatively stationary clutch member rigid with the gear, with the slidable clutch member normally out of engagement with the companion clutch member; means acting to move the slidable clutch member into its operative position, and means whereby an arresting of the operation of the first-mentioned shaft at the end of each complete rotation of the said shaft and the actuation of the slidable clutch member into its inoperative position are simultaneously effected.

21. The combination, with an annealing-chamber provided, at one side, with a ware-receiving inlet, and a conveyer extending through the said inlet and transversely of the aforesaid chamber and having ware-feeding members spaced longitudinally of the conveyer, of an intermittently-rotated shaft having a laterally-projecting arm; mechanism for transmitting motion from the said shaft to the conveyer; a driving-shaft; a gear loosely mounted on the driving-shaft and operatively connected with the aforesaid intermittently-rotated shaft; a clutch for controlling operative connection between the gear and the driving-shaft and comprising a clutch member operatively and slidably mounted on the driving-shaft and a relatively stationary clutch member rigid with the gear, with the slidable clutch member normally out of engagement with the companion clutch member; means acting to move the slidable clutch member into its operative position; a shiftable stop-forming bar or member operatively connected with the slidable clutch member and normally projecting into the path of the aforesaid shaft-arm and coöperating with the said arm in holding the slidable clutch member in its inoperative position, and means for actuating the said stop-forming member out of the said path.

22. The combination, with an annealing-chamber provided, at one side, with a ware-receiving inlet, and a conveyer extending through the said inlet and transversely of the aforesaid chamber and having ware-feeding members spaced longitudinally of the conveyer, of an intermittently-rotated shaft having a laterally-projecting arm; mechanism for transmitting motion from the said shaft to the conveyer; a driving-shaft; a gear loosely mounted on the driving-shaft and operatively connected with the aforesaid intermittently-rotated shaft; a clutch for controlling operative connection between the gear and the driving-shaft and comprising a clutch member operatively and slidably mounted on the driving-shaft and a relatively stationary clutch member rigid with the gear, with the slidable clutch member normally out of engagement with the companion clutch member; means acting to move the slidable clutch member into its operative position; a lever for actuating the slidable clutch member into its inoperative position, which lever is provided with an arm extending in the direction of the aforesaid shaft-arm; a stop-forming bar or member carried by and shiftable endwise of the said lever-arm and normally extending into the path of the shaft-arm, and means for actuating the said stop-forming member out of the said path.

23. The combination, with an annealing-chamber provided, at one side, with a ware-receiving inlet, and a conveyer extending through the said inlet and transversely of the aforesaid chamber and having ware-feeding members spaced longitudinally of the conveyer, of an intermittently-rotated shaft having a laterally-projecting arm; mechanism for transmitting motion from the said shaft to the conveyer; a driving-shaft; a gear loosely mounted on the driving-shaft and operatively connected with the aforesaid intermittently-rotated shaft; a clutch for controlling operative connection between the gear and the driving-shaft and comprising a clutch member operatively and slidably mounted on the driving-shaft and a relatively stationary clutch member rigid with the gear, with the slidable clutch member normally out of engagement with the companion clutch member; a suitably-applied spring acting to move the slidable clutch member into its operative position; a lever for actuating the slidable clutch member into its inoperative position, which lever is provided with an arm extending in the direction of the aforesaid shaft-arm; a stop-forming bar normally extending into the path of the said shaft-arm and carried by and shiftable endwise of the aforesaid lever-arm; means acting to maintain the extension of the said stop-forming member into the said path, and means for actuating the said stop-forming member out of the said path.

24. The combination, with an annealing-chamber provided, at one side, with a ware-receiving inlet, and a conveyer extending through the said inlet and transversely of the aforesaid chamber and provided with ware-feeding members spaced longitudinally of the conveyer, of a carrier for conveying ware to the aforesaid inlet and comprising a carriage having a platform tiltable by a load and provided with a projecting member which is in an operative or inoperative position according as the platform is laden or unladen, and means instrumental in the control of the operation of the aforesaid conveyer and arranged to be operated by the said projecting member of the platform.

25. The combination, with an annealing-chamber provided, at one side, with a ware-receiving inlet, and a conveyer extending through the said inlet and transversely of the aforesaid chamber and provided with ware-feeding members spaced longitudinally of the conveyer, of a carrier for conveying ware to the aforesaid inlet and comprising a carriage having a platform tiltable by a load and provided with a projecting member which is in an operative or inoperative position according as the platform is laden or unladen; an endwise-shiftable bar instrumental in the control of the operation of the aforesaid conveyer and arranged to be actuated by the aforesaid projecting member of the platform, and means for disengaging the said bar from the said projecting member.

26. In combination, with an annealing-chamber provided, at one side, with a ware-receiving inlet, and a conveyer extending through the said inlet and transversely of the aforesaid chamber and having ware-feeding members spaced longitudinally of the conveyer, and mechanism for intermittently operating the conveyer, of a bar arranged externally and longitudinally of the annealing-chamber at an elevation below and in suitable proximity to the aforesaid inlet; a carrier for conveying ware to the said inlet and comprising a carriage having a vertically-tiltable platform adapted to receive and carry ware to be annealed, which platform has a projecting member for engaging and actuating the aforesaid bar; means for disengaging the said bar from the said projecting member, and means whereby the actuation of the said bar by the said projecting member results in the operation of the aforesaid conveyer, and the arrangement of the parts being such that the said projecting member of the platform shall be inoperative without a load upon the platform and rendered operative upon the tilting of the laden platform.

27. The combination, with an annealing-chamber provided, at one side, with a ware-receiving inlet, and a conveyer extending through the said inlet and transversely of the aforesaid chamber and having ware-feeding members spaced longitudinally of the conveyer, and mechanism for intermittently operating the conveyer, of a shiftable bar or member instrumental in the operation of the aforesaid conveyer and arranged externally of the annealing-chamber at an elevation below and in suitable proximity to the aforesaid inlet, which bar is provided with a slot; a stationary pin or member engaging the said slot; a carrier for conveying ware to the said inlet and comprising a carriage having a vertically-tiltable platform adapted to receive and carry ware to be annealed, which platform has a projecting member for engaging the aforesaid slotted member, and the arangement of the parts and the trend of the aforesaid slot being such that the projecting member of the platform shall be inoperative without a load upon the platform and rendered operative upon the tilting of the laden platform, and the bar, upon the performance of its function, shall be disengaged from the projecting member of the platform.

28. The combination, with an annealing-chamber provided, at its forward end and at one side, with a ware-receiving inlet; a shelf or table arranged to receive ware at the outer side of the said inlet and provided with a forwardly-facing stop-forming wall adjacent the rear side wall of the said inlet; a track extending in under and rearwardly of the said table; an endless carrier extending and guided along the said track and comprising a carriage having a vertically-tiltable ware-receiving platform tilted by a load and provided with laterally-spaced seat-forming flanges which extend longitudinally of the platform and project upwardly above the horizontal plane in which the upper surface of the table is arranged, which platform is provided also with a laterally-projecting member, and the table and its stop-forming wall being slotted to accommodate the location of the aforesaid flanges during the actuation of the carrier, of a conveyer extending through the aforesaid inlet and transversely of the aforesaid chamber and over the table and provided with ware-feeding members spaced longitudinally of the conveyer; means for intermittently actuating the said conveyer; means instrumental in controlling the operation of the conveyer and arranged to be operated by the aforesaid laterally-projecting member of the platform when the latter has been tilted by a load.

29. The combination, with an annealing-chamber, and an endless conveyer for conveying ware through the said chamber, of a ratchet-wheel operatively connected with the said conveyer; two pivotally-supported pawls engaging notches between teeth of the said wheel and projecting in opposite directions respectively and so relatively arranged that when one of the pawls is in full engagement with the engaging notch in the ratchet-wheel the other pawl is only half-way within the opposing notch of the said wheel; a segment-gear carrying the said pawls; another segment-gear meshing with the pawl-bearing gear, and means for intermittently operating the last-mentioned gear.

30. The combination, with an annealing-chamber provided, at one side, with a ware-receiving inlet; an endless conveyer arranged to carry ware within and longitudinally of the said chamber, and mechanism for intermittently actuating the said conveyer, of another conveyer extending through the aforesaid inlet and transversely of the aforesaid chamber, which conveyer has ware-feeding wings arranged transversely and spaced longitudinally of the conveyer; means for intermittently actuating the winged conveyer, and means whereby a series of actuations of the winged conveyer results in the operation of the aforesaid mechanism.

31. The combination, with an annealing-chamber, and an endless conveyer for carrying ware within and longitudinally of the said chamber, of an intermittently-rotated shaft; a revoluble cam operatively connected with the said shaft; mechanism for transmitting motion from the said shaft to the said conveyer; a driving-shaft; a pinion loosely mounted on the driving-shaft and operatively connected with the intermittently-rotated shaft; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position; a lever operatively connected with the slidable clutch member; a shiftable member carried by the lever and arranged to be actuated by the aforesaid cam and coöperating with the cam in holding the slidable clutch member in its normal position; means acting to retain the said shiftable member of the lever in its normal position, and means for actuating the said shiftable lever member out of the path of the said cam.

32. The combination, with an annealing-chamber, and an endless conveyer for carrying ware within and longitudinally of the said chamber, of an intermittently-rotated shaft; a revoluble cam operatively connected with the said shaft; mechanism for transmitting motion from the said shaft to the said conveyer; a driving-shaft; a pinion loosely mounted on the driving-shaft and operatively connected with the intermittently-rotated shaft; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position; a lever operatively engaging the slidable clutch member and provided with a slideway; a slide engaging the said slideway and having a member normally projecting into the path of the aforesaid cam; means for actuating the slide to disengage its projecting member from the aforesaid path, and means acting to move the slide in the opposite direction.

33. The combination, with an annealing-chamber, and an endless conveyer for carrying ware within and longitudinally of the said chamber, of an intermittently-rotated shaft, a revoluble cam operatively connected with the said shaft; mechanism for transmitting motion from the said shaft to the said conveyer; a driving-shaft arranged parallel with the first-mentioned shaft; a pinion loosely mounted on the driving-shaft and operatively connected with the intermittently-rotated shaft; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position; a lever operatively engaging the slidable clutch member and provided with a slideway arranged transversely of the driving-shaft; a slide engaging the said slideway and having a member normally projecting into the path of the aforesaid cam in the normal position of the slidable clutch member, and means for actuating the slide to disengage its projecting member from the aforesaid path.

34. The combination, with an annealing-chamber, and an endless conveyer for carrying ware within and longitudinally of the said chamber, of an intermittently-rotated shaft; a gear operatively mounted on the said shaft and provided with a cam; mechanism for transmitting motion from the said shaft to the said conveyer; a driving-shaft arranged parallel with the first-mentioned shaft; a pinion loosely mounted on the driving-shaft and meshing with the aforesaid gear; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position; a lever operatively engaging the slidable clutch member and provided with a slideway arranged above and transversely of the driving-shaft; a slide engaging the said slideway and provided with a member normally projecting into the path of the aforesaid cam; means for actuating the slide to disengage its projecting member from the said path, and means acting to move the slide in the opposite direction.

35. The combination, with an annealing-chamber provided, at one side, with a ware-receiving inlet; a conveyer extending through the said inlet and transversely of the aforesaid chamber and having ware-feeding members spaced longitudinally of the conveyer; means for intermittently actuating the said conveyer; an endless conveyer for carrying ware within and longitudinally of the annealing-chamber; mechanism for intermittently actuating the said endless conveyer; a driving-shaft; a pinion loosely mounted on the driving-shaft and instrumental in transmitting motion to the said mechanism; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position, and mechanism operating to retain the slidable clutch member in its normal and inoperative position, of an intermittently-rotated cam-wheel operatively connected with the first-mentioned conveyer and arranged to render the last-mentioned mechanism inoperative once during each complete rotation of the cam-wheel.

36. The combination, with an annealing-chamber provided, at one side, with a ware-receiving inlet; a conveyer extending through the said inlet and transversely of the aforesaid chamber and having ware-feeding members spaced longitudinally of the conveyer; means for intermittently actuating the said conveyer; an endless conveyer for carrying ware within and longitudinally of the annealing-chamber; an intermittently-rotated shaft; a revoluble cam operatively connected with the said shaft; mechanism for transmitting motion from the said shaft to the said conveyer; a driving-shaft; a pinion loosely mounted on the driving-shaft and operatively connected with the intermittently-rotated shaft; a clutch for controlling operative connection between the pinion and the driving-shaft and comprising a clutch member operatively and slidably mounted on the driving-shaft and a relatively stationary clutch member rigid with the pinion, with the slidable clutch member normally out of engagement with the companion clutch member; means acting to move the slidable clutch member into its operative position; a lever operatively engaging the slidable clutch member and provided with a slideway; a slide engaging the said slideway and arranged to be actuated by the aforesaid cam and coöperating with the cam in holding the slidable clutch member in its normal and inoperative position, which slide has a projecting member, and means acting to retain the said slide in its normal position, of a lever having a slot engaged by the said projecting member of the slide, and an intermittently-rotated cam-wheel operatively connected with the first-mentioned conveyer and arranged to operate the last-mentioned lever once during each complete rotation of the last-mentioned cam-wheel, all arranged and operated substantially as and for the purpose set forth.

Signed by us at Cleveland, Ohio, this 24th day of October, 1903.

HARRY H. BRIDGWATER.
JONATHAN HALEY.

Witnesses:
C. H. DORER,
G. M. HAYES.